United States Patent [19]

Berger

[11] 3,977,528
[45] Aug. 31, 1976

[54] RACK HAVING SUPPORTING TUBES CONNECTED BY MEANS OF RELEASABLE COUPLINGS

[75] Inventor: Volker Ernst Uwe Berger, Mombris, Germany

[73] Assignee: Orschler Produktion KG, Stockstadt, Germany

[22] Filed: May 19, 1975

[21] Appl. No.: 578,625

[30] Foreign Application Priority Data
May 21, 1974 Germany.................... 7417684[U]

[52] U.S. Cl............................. 211/182; 108/64; 403/290
[51] Int. Cl.²..................................... A47B 97/00
[58] Field of Search .......... 211/176, 177, 178, 181, 211/182, 183; 248/165, 166, 159; 108/64, 153; 403/290

[56] References Cited
UNITED STATES PATENTS

| 658,493 | 9/1900 | Trigwell............................. 403/290 |
| 1,297,610 | 3/1919 | Tschudin............................ 403/290 |
| 1,707,363 | 4/1929 | Opremchak........................ 403/290 |
| 3,276,400 | 10/1966 | Brunette......................... 211/177 X |
| 3,521,579 | 7/1970 | Stafford.......................... 108/153 X |
| 3,620,558 | 11/1971 | MacMillan........................ 403/290 |

FOREIGN PATENTS OR APPLICATIONS

| 65,309 | 1/1947 | Denmark........................... 211/177 |
| 1,293,229 | 4/1962 | France............................. 248/165 |
| 1,078,295 | 11/1954 | France............................. 160/135 |
| 719,968 | 12/1954 | United Kingdom............ 211/178 R |
| 1,136,288 | 12/1968 | United Kingdom................ 211/177 |

Primary Examiner—Roy D. Frazier
Assistant Examiner—Terrell P. Lewis

[57] ABSTRACT

The invention relates to a tubular type of display rack assembly having tubular support members joined by coupling means. The coupling means includes units thereof which have two or more tubular members rigidly attached together in parallel relation to each other. Each such coupling unit facilitates the joining of a plurality of support members at any juncture to facilitate great flexibility in design possibilities for a display rack assembly.

5 Claims, 6 Drawing Figures

RACK HAVING SUPPORTING TUBES CONNECTED BY MEANS OF RELEASABLE COUPLINGS

The invention relates to a rack having supporting tubes which are connected by means of releasable couplings, one of said couplings at least having a cylindrical portion the outer diameter of which being larger than the coupling ends which are introduced axially into the connected supporting tubes.

This rack may serve to position or suspend articles, in particular to demonstrate goods.

In a known rack of the type just referred to, each coupling consists of a single intermediate member having two coaxial plug pins and a collar arranged therebetween. The plug pins are put into the straight supporting tubes to be interconnected. In this way only coaxial supporting tubes can be connected. A corner connection is not possible.

There are also known racks from rectangular or circular tubes to be positioned in the room center, said tubes being interconnected by means of corner connecting portions at the ends or by means of angle pieces of 90 degrees.

Both types of racks are limited to relatively fixed shapes. The connections are not sufficiently stable in any case. A rapid change of design for instance desired in department stores frequently requires skilled people. The provision of electrical lamps being integrated into the rack causes difficulties with respect to the invisible laying of the supply cables.

The invention is based on the problem to provide a rack of the type mentioned at the beginning which permits a simple, rapid and multiple change of design for the most different possibilities of application.

In accordance with the invention this problem is solved for a rack of the type referred to at the beginning in that the cylindrical portion of the coupling is a coupling tube which is rigidly connected with at least one further coupling tube extending in parallel therewith, and that the coupling ends axially introduced into the supporting tubes are clamped therein and are formed of coupling portions engaging respectively one of the coupling tubes and being rotatable in at least one of the coupling tubes.

Because of this structure of the rack it is possible to connect all the supporting tubes individually with one another. The preproduction of frames is not required. The ends of the supporting tubes to be interconnected may extend in parallel, so that two or more supporting tubes being formed equally or distinguishing from one another, preferably straight supporting tubes being bent near the ends at a definite radius, can be rotated relative to one another or pivotally connected by means of the same coupling. This provides a multitude of variations in the shape of the rack. The plug and clamp connections can be made or, respectively, separated easily and quickly by unskilled people. It is possible to build all shapes required or desired for the most different articles to be positioned and/or suspended, particularly goods, even by taking into consideration artistic points of view. Inserts, floors and lamps can be positioned harmonically, and said inserts can be produced therefrom if need be. The coupling tubes not only ensure that the coupling portions can rotate but at the same time that a high winding stiffness of the connection is provided around all remaining axes extending transversely to the longitudinal axis of the coupling tubes. This provides a high stability of the rack.

Preferably provision is made for the fact that the ends of the coupling portions engaging the supporting tubes have an axial slot, that respectively in the one leg of the slot it is formed a radial thread bore into which is screwed a screw until the oppositely located leg of the slot by expanding the slot up to the application of the slot legs on the inner side of the supporting tube, and that the ends of the supporting tubes comprise radial holes to guide therethrough the screws. In this way it is possible to effect high clamping forces between the supporting tube and the coupling portion in contrast to a slight power expenditure of the mechanic. The clamping device can be noted from the exterior only because of the small hole within the supporting tube, so that it does not impair the total impression, and as to space does not form any obstacle. The connection or separation of two supporting tubes can be effected simply by means of tensioning or releasing the clamping screws.

If one coupling portion is passing the associated coupling tube, thus it is also possible to connect the two ends of two supporting tubes coaxially as this coupling portion then is respectively slotted at both ends.

It is advantageous if each coupling portion is formed to be a tube In this way — compared with a massive coupling portion — the expenditure of material and the weight is reduced with a nevertheless sufficiently high strength.

Preferably the lengths of the coupling tube is a multiple of its diameter. This results in a specially high stability of the rack with respect to the maintainance of the position of the supporting tubes to one another when being charged and on an uneven ground. There is no need of special means to balance unevennesses of the floor.

The screws may be setscrews with an inner hexagonal. These screws, though they have high strength, require small space, particularly as they are expanded by the screw tools.

The coupling tubes and the supporting tubes preferably are of even outer diameter. Having such dimensions, the coupling adapts the supporting tubes without any transition.

The supporting tubes may comprise straight, U-type, four times-bent and approximately semicircularly-bent supporting tubes. This ensures a particularly large variety of possibilities of designs compared with a small variety of supporting tubes.

It is particularly advantageous if a lamp is attached to the free end of at least one of the supporting tubes being formed about semicircularly. This lamp fits harmonically into the rack structure and takes care of a direct illumination of the articles in the rack. Separate lamps such as at room ceilings or room walls are not needed. If several about semicircular supporting tubes with lamp are connected by a single coupling, thus it is resulting a group of chandeliers branching esthetically like a tree or fountain. But it is also possible to form illuminated arcades.

In this connection it is preferably taken care for the fact that at least some of the coupling tubes and coupling portions comprise a breakthrough to lay an electrical cable. In this manner It is possible to lay the cable invisibly up to the lamps.

The invention and its further improvements are described as follows on the basis of diagrammatical drawings of preferred examples of embodiment.

Figure 1:
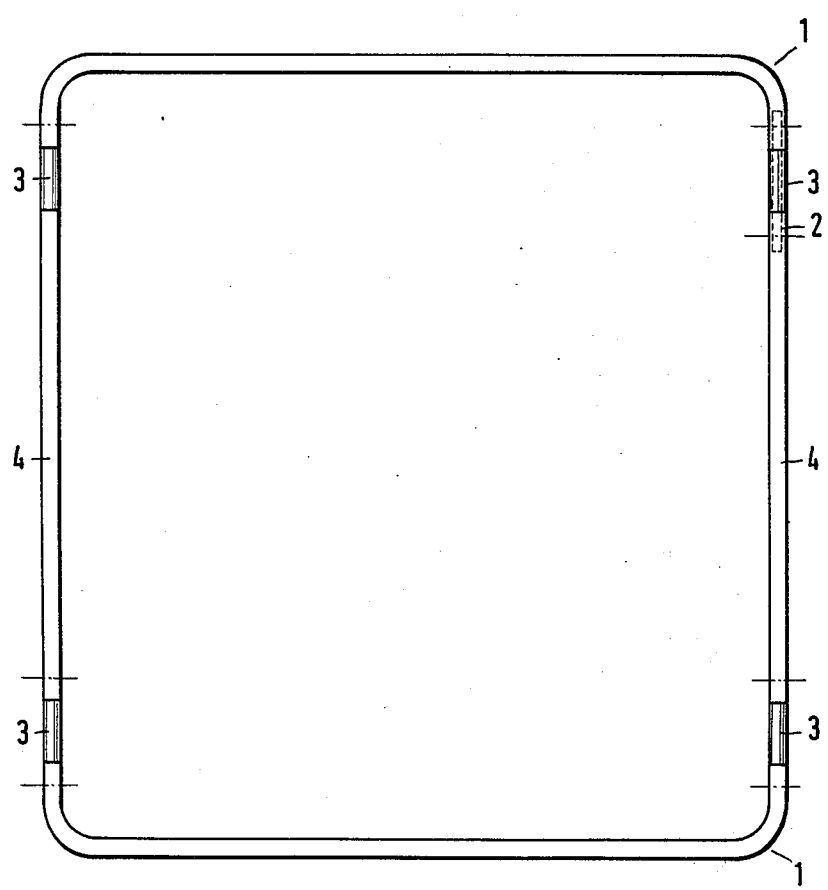
FIG. 1 represents a rack frame element composed of supporting tubes and couplings.
Figure 5:
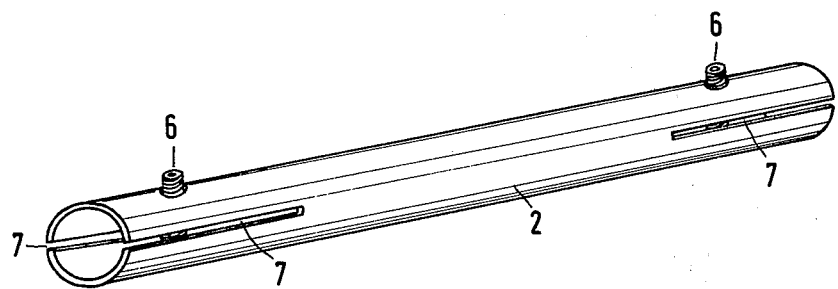
FIG. 5 is a perspective view of a tubular coupling portion.

The frame element according to FIG. 1 consists of U-type supporting tubes 1, tubular coupling portions 2, coupling tubes 3 and straight supporting tubes 4. Supporting tube 1 is a steel tube bent at both ends at a definite radius by 90° and provided with bores 5, said tube serving at the same time as transverse connecting tube and rod to suspend cloths. The straight ends serve to receive respectively one of the coupling portions 2 which respectively are conducted through with play and hence rotatably through a coupling tube 3. Each coupling portion 2 consists of steel tube and is provided at both ends with an axial slot 7 as is clearly shown in FIG. 5. In respectively one of the legs of a slot 7 it is formed a radial thread bore near the leg ends and in a plane being vertical to the plane of the slot. A setscrew 6 with an inner hexagonal is respectively screwed into the thread bores. The length of the setscrews is dimensioned such that the slots 7 are forced apart from one another when screwing-in the setscrews, so that the legs of slots 7 apply at the inner side of the supporting tubes in rigid manner when having been introduced into said tubes.

Figure 4:
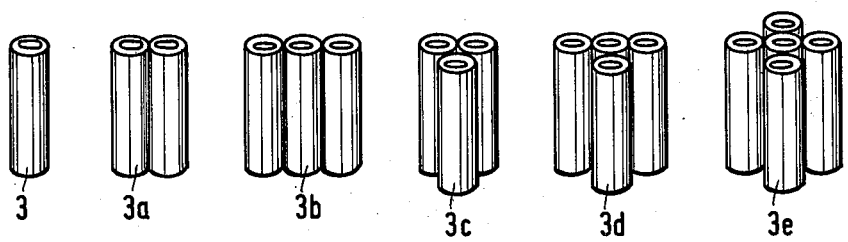
FIG. 4 represents different combinations of coupling tubes.

Coupling tubes 3, 3a, 3b, 3c, 3d, 3e also represent circular tubes from steel. Their outer diameter is equal to that of the supporting tubes 1, 4, 8, 9 and 10. As is shown in FIG. 4, the coupling tubes may consist of one, two or several individual tubes being rigidly interconnected or for instance welded together.

The straight supporting tubes are provided at both ends with a hole 5 to conduct therethrough the setscrews or, respectively, a screw spanner, and they are available as intermediate portions in different lengths. The angled or, respectively, bent supporting tubes 1, 8, 9, 10 are likewise provided at both ends with respective holes 5.

Figure 2:
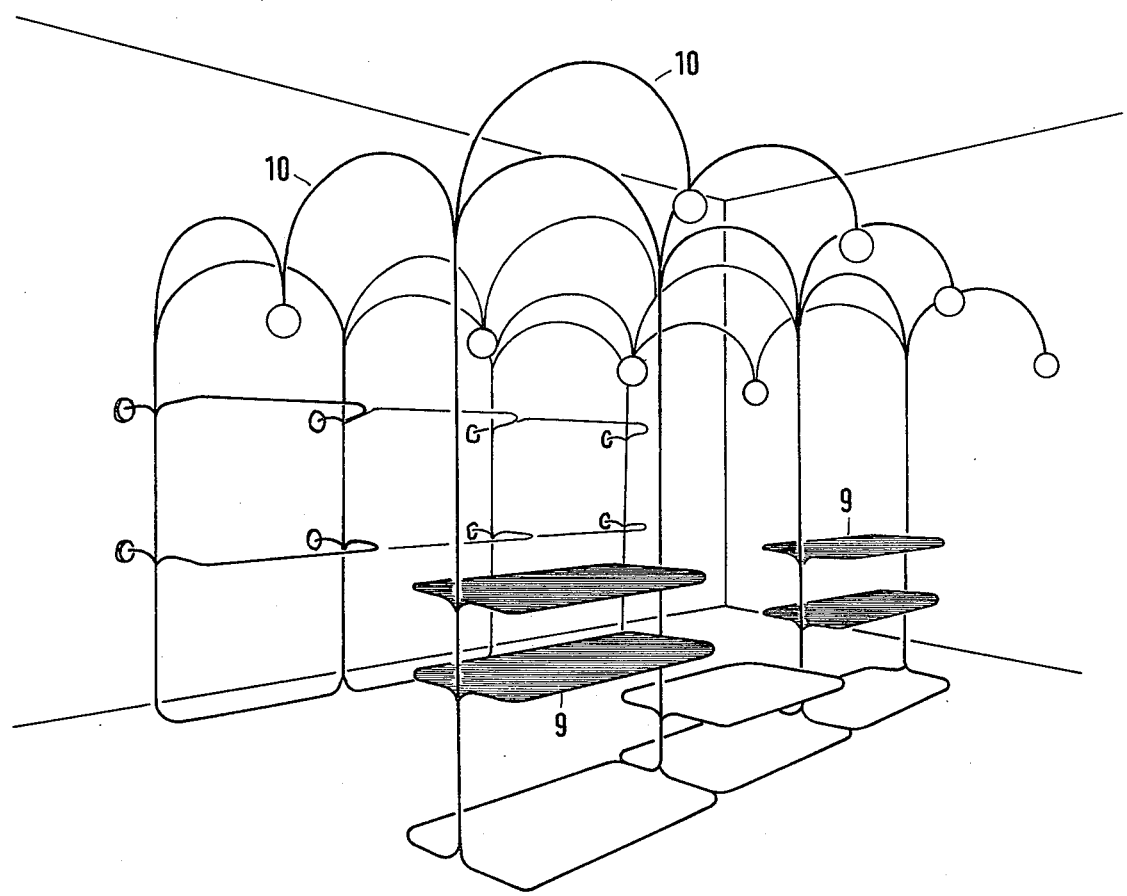
FIG. 2 is a perspective view of a rack.
Figure 3:
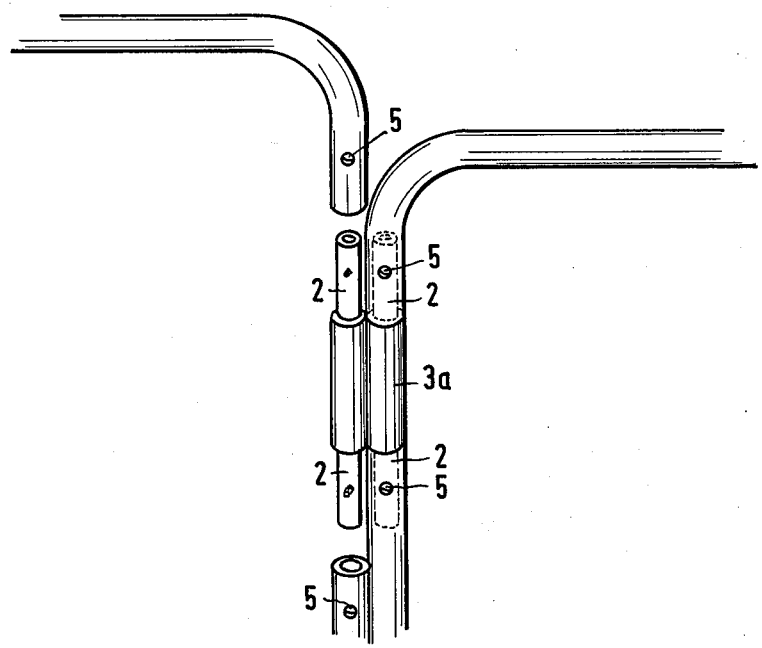
FIG. 3 shows the connection of several supporting tubes by means of one coupling.

In order to structure the most different racks or shelves, the supporting tubes can be interconnected by means of the couplings 2, 3, . . . , 3e. FIG. 2 shows as an example a larger rack comprising a wall rack part and a rack part for a room center which are interconnected through supporting tubes 10 formed to be ceiling arcs. For this purpose it is possible to arrange superordinatedly more than two straight supporting tubes 4 in coaxial manner and several supporting tubes 1, 8 or 9 in different hights.

When connecting two supporting tubes being coaxial at least at the ends thereof, a coupling portion 2 is inserted through a coupling tube, for instance into the coupling tube 3a, thus far into one end of one of the supporting tubes until the setscrew 6 appears in hole 5. Then the setscrew is tightened by means of a hexagonal screw spanner. Subsequently the end of the other supporting tube is moved onto the other end of coupling portion 2 projecting from the coupling tube 3a, and is likewise clamped by tightening the second setscrew 6. As the outer diameter of the coupling portion 2 is smaller than the inner diameter of the coupling tube 3a, the two supporting tubes coupled through a coupling portion 2 can be rotated relative to the coupling tube 3a. Accordingly, the two rigidly intercoupled supporting tubes can also be rotated relative to a third supporting tube which is coupled with the two first supporting tubes via a multiple coupling tube 3a, . . . , 3e and a second coupling portion 2. This renders possible a change of length and width of the rack by means of a respective change of the angle of rotation, without the need of a release of a coupling. But nevertheless the stability of the rack is ensured even on uneven floors, since at each coupling place tubular sections interengage which in relation to the diameter are respectively long. Nevertheless, the couplings do not disturb the optical impression as they connect coaxial supporting tubes with practically no transition.

Figure 6:
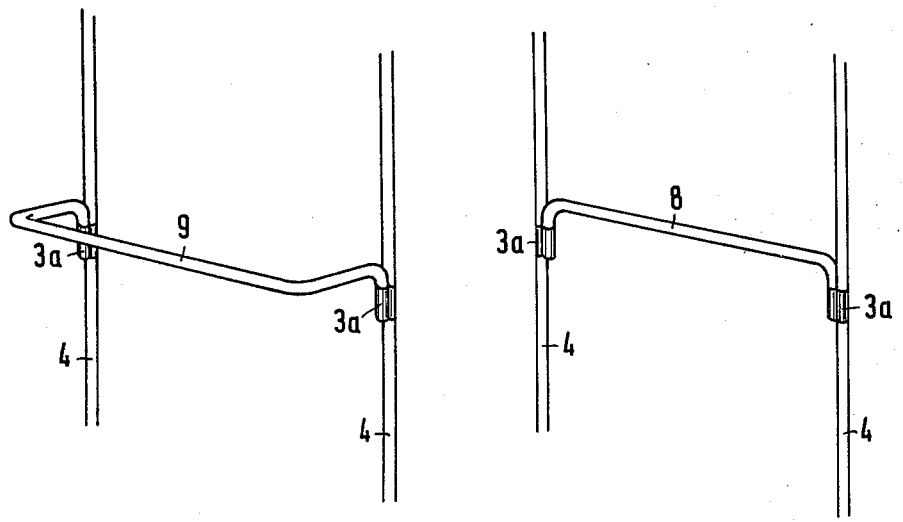
FIG. 6 shows supporting tube connections in perspective representation serving to position floors or to suspend articles, particularly cloths.

In order to couple angled or bent supporting tubes 1, 8, 9, 10 by their ends in parallel to one another or with a straight supporting tube 4, as is illustrated in FIGS. 2 and 6, it is required one coupling portion being slotted at one end only and corresponding to about half the coupling portion 2, so that it does not project from the free end of a coupling tube 3a, . . . , 3e.

The supporting tube 8 preferably serves to suspend cloths while supporting tube 9 can be used to position floors from for instance glass or timber.

Supporting tubes 10 being about semicircular in shape can be used to form homogenous transitions from a wall shelf to a shelf in the room center and/or to form chandeliers in the upper part of the shelf. For this purpose it is possible to connect a plurality of the supporting tubes 10 at one end by means of one multiple coupling, for instance multiple coupling 3c or 3e such as shown in FIG. 2. Advantageously, the couplings are then provided with breakthroughs to conduct therethrough cables. It is in this way possible to lay invisibly the current supply cables from lamps attached to the free ends of the supporting tubes 10 within the supporting tubes and couplings.

Departures from the example of embodiment demonstrated are within the scope of the invention. Thus it is possible to arrange supporting tubes 10 provided with lamps at different heights one above the other. It is also possible to arrange directly superimposedly two multiple coupling tubes, for instance the multiple coupling tubes 3e, and to connect the same by means of a longer coupling portion 2 which passes two of the superimposedly arranged coupling tubes up into the supporting tubes to be interconnected. In order to broaden the connecting possibilities, it is in this way possible to form a multiple coupling tube with $n-1$ coupling tubes from two multiple coupling tubes having in total $n$-coupling tubes.

I claim:

1. A rack assembly having tubular support members and tubular coupling means having equal inside diameters, coupling portions having outside diameters equal to said inside diameters for joining selective ones of said support members to selected ones of said tubular coupling means, said tubular coupling means including units thereof having at least two tube members fixedly joined in adjacent parallel relation to each other, said coupling portions including at least one unit thereof having an axially extending bifurcating slot at at least one end thereof, one of said tubular support members having a hole at one end thereof a threaded bore in said one unit aligned with said hole, and a screw extending through said hole into said bore for expanding said slot.

2. A rack assembly according to claim 1 wherein said one unit of said coupling portions extends entirely through one of said tubular coupling means.

3. A rack assembly according to claim 1 wherein at least one unit of said coupling means has a length which is an integer multiple of its outside diameter.

4. A rack assembly according to claim 1 wherein said screw is a set screw.

5. A rack assembly according to claim 1 wherein the outside diameters of said tubular support members and said tubular coupling means are equal.

* * * * *